US010668907B2

(12) United States Patent
Miki et al.

(10) Patent No.: US 10,668,907 B2
(45) Date of Patent: Jun. 2, 2020

(54) BICYCLE HYDRAULIC OPERATING DEVICE

(71) Applicant: Shimano Inc., Sakai, Osaka (JP)

(72) Inventors: Yoshimitsu Miki, Osaka (JP); Kentaro Kosaka, Osaka (JP); Keji Matsueda, Osaka (JP)

(73) Assignee: Shimano Inc., Osaka (JP)

( * ) Notice: Subject to any disclaimer, the term of this patent is extended or adjusted under 35 U.S.C. 154(b) by 239 days.

(21) Appl. No.: 15/184,948

(22) Filed: Jun. 16, 2018

(65) Prior Publication Data

US 2017/0361819 A1    Dec. 21, 2017

(51) Int. Cl.
| | |
|---|---|
| *B60T 11/26* | (2006.01) |
| *B60T 7/10* | (2006.01) |
| *B60T 11/16* | (2006.01) |
| *B62K 23/06* | (2006.01) |
| *B62L 3/02* | (2006.01) |

(52) U.S. Cl.
CPC ............... *B60T 11/26* (2013.01); *B60T 7/102* (2013.01); *B60T 11/16* (2013.01); *B62K 23/06* (2013.01); *B62L 3/023* (2013.01)

(58) Field of Classification Search
CPC .......... B60T 11/16; B60T 11/22; B60T 7/102; B60T 11/26; B62L 3/023; B62L 1/00; B62K 23/06
See application file for complete search history.

(56) References Cited

U.S. PATENT DOCUMENTS

| | | | |
|---|---|---|---|
| 7,779,718 B2 | 8/2010 | Jordan et al. | |
| 8,448,762 B2 | 5/2013 | Hirose et al. | |
| 8,905,205 B2 | 12/2014 | Matsushita | |
| 9,290,232 B2 | 3/2016 | Snead | |
| 2003/0121736 A1 | 7/2003 | Lumpkin | |
| 2007/0215417 A1* | 9/2007 | Chen ..................... | B62L 3/023 188/24.22 |
| 2009/0031841 A1 | 2/2009 | Tetsuka | |
| 2015/0001018 A1* | 1/2015 | Kariyama ............... | B62L 3/023 188/344 |
| 2015/0090112 A1 | 4/2015 | Matsueda et al. | |

\* cited by examiner

*Primary Examiner* — Abiy Teka
(74) *Attorney, Agent, or Firm* — Global IP Counselors, LLP

(57) ABSTRACT

A bicycle hydraulic operating device is basically provided with a base member, a piston, an operating member and a hydraulic reservoir. The base member includes a cylinder bore. The piston is movably disposed in the cylinder bore. The operating member is coupled to the piston to move the piston within the cylinder bore. The hydraulic reservoir includes a hydraulic reservoir tank and a reservoir lid. The hydraulic reservoir is provided on the base member and is fluidly connected to the cylinder bore by a fluid passage. At least part of one of the base member and the hydraulic reservoir includes a fluid inspection portion making visually perceptible therethrough at least a portion of a hydraulic fluid flow path that includes the hydraulic reservoir, the cylinder bore and the fluid passage.

16 Claims, 7 Drawing Sheets

BICYCLE HYDRAULIC OPERATING DEVICE

BACKGROUND

Field of the Invention

This invention generally relates to a bicycle hydraulic operating device. More specifically, the present invention relates to a bicycle hydraulic operating device for operating a hydraulically actuated component of a bicycle.

Background Information

Bicycle hydraulic brake systems are typically actuated by a hydraulic brake operating device. The hydraulic brake operating device typically includes a master piston that is slidably disposed in a cylinder bore of a master cylinder, and a brake lever actuating the master piston. The master cylinder contains a hydraulic fluid. The cylinder bore of the master cylinder is in fluid communication with a disc brake caliper housing in the case of a hydraulic disc brake via a fluid conduit. Brake pads of the disc brake caliper housing are typically spaced apart from a rotor by a predetermined gap. The movement of fluid into the caliper housing causes the pistons in the caliper housing to move, and eventually brings the brake pads into contact with a rotor.

SUMMARY

Generally, the present disclosure is directed to various features of a bicycle hydraulic operating device.

In view of the state of the known technology and in accordance with a first aspect of the present disclosure, a bicycle hydraulic operating device is basically provided that comprises a base member, a piston, an operating member and a hydraulic reservoir. The base member includes a cylinder bore. The piston is movably disposed in the cylinder bore. The operating member is coupled to the piston to move the piston within the cylinder bore. The hydraulic reservoir is provided on the base member and is fluidly connected to the cylinder bore by a fluid passage. At least part of one of the base member and the hydraulic reservoir includes a fluid inspection portion making visually perceptible therethrough at least a portion of a hydraulic fluid flow path that includes the hydraulic reservoir, the cylinder bore and the fluid passage. According to the first aspect of the present invention, the bicycle hydraulic operating device is configured so that a state of the hydraulic fluid in the hydraulic fluid flow path of the bicycle hydraulic operating device is easily confirmed.

In accordance with a second aspect of the present invention, the bicycle hydraulic operating device according to the first aspect is configured so that the hydraulic reservoir includes a hydraulic reservoir tank provided on the base member, a reservoir lid closing a tank opening of the hydraulic reservoir tank and a diaphragm that is at least partially disposed inside the hydraulic reservoir tank. According to the second aspect of the present invention, the state of the hydraulic fluid is confirmed without disassembling the reservoir lid and the diaphragm.

In accordance with a third aspect of the present invention, the bicycle hydraulic operating device according to the second aspect is configured so that the hydraulic reservoir tank and the base member are made of a resin material. According to the third aspect of the present invention, the bicycle hydraulic operating device is configured such that the base member and the reservoir tank are easily provided as lightweight portions for reducing an overall weight of the bicycle hydraulic operating device.

In accordance with a fourth aspect of the present invention, the bicycle hydraulic operating device according to the second or third aspect is configured so that the reservoir lid is made of a resin material. According to the fourth aspect of the present invention, the bicycle hydraulic operating device is configured such that the reservoir lid is easily provided as lightweight portion for reducing an overall weight of the bicycle hydraulic operating device.

In accordance with a fifth aspect of the present invention, the bicycle hydraulic operating device according to any one of the second to fourth aspects is configured so that the fluid inspection portion is disposed on at least one of the hydraulic reservoir tank, the reservoir lid and the diaphragm. In general, there is tendency that air in the hydraulic fluid flow path is gathered to the hydraulic reservoir. According to the fifth aspect of the present invention, the state of the hydraulic fluid in the hydraulic fluid flow path is more easily confirmed.

In accordance with a sixth aspect of the present invention, the bicycle hydraulic operating device according to any one of the second to fifth aspects is configured so that the hydraulic reservoir tank is bonded to the base member. According to the sixth aspect of the present invention, the bicycle hydraulic operating device is configured such that the hydraulic reservoir tank is easily provided on the base member.

In accordance with a seventh aspect of the present invention, the bicycle hydraulic operating device according to any one of the second to sixth aspects is configured so that the hydraulic reservoir tank is fixed to the base member by a fastenerless joint. According to the seventh aspect of the present invention, the bicycle hydraulic operating device is configured such that the reservoir tank is more easily provided on the base member.

In accordance with an eighth aspect of the present invention, the bicycle hydraulic operating device according to any one of the first to seventh aspects further comprises a bleed port fluidly connected to the hydraulic fluid flow path. According to the eighth aspect of the present invention, a bleeding process is started after confirming the state of the hydraulic fluid in the hydraulic fluid flow path.

In accordance with a ninth aspect of the present invention, the bicycle hydraulic operating device according to the eighth aspect is configured so that the bleed port is disposed on the hydraulic reservoir. In general, there is tendency that air in the hydraulic fluid flow path is gathered to the hydraulic reservoir. According to the ninth aspect of the present invention, the bleeding process becomes easy.

In accordance with a tenth aspect of the present invention, the bicycle hydraulic operating device according to any one of the first to ninth aspects further comprises a handlebar mounting structure disposed on the base member. According to the tenth fourteenth aspect of the present invention, the bicycle hydraulic operating device is configured such that the base member can be effectively located for easy use by a rider.

In accordance with an eleventh aspect of the present invention, the bicycle hydraulic operating device according to any one of the first to tenth aspects is configured so that the operating member includes a lever pivotally mounted relative to the base member. According to the eleventh aspect of the present invention, the operating member is configured as a lever so that the operating member can be easily operated by a rider.

In accordance with a twelfth aspect of the present invention, the bicycle hydraulic operating device according to any one of the first to eleventh aspects is configured so that the base member is configured to be gripped by a user. An inner space of the base member is limited and the hydraulic fluid flow path becomes complicated since the base member is configured to be gripped by a user. According to the twelfth aspect of the present invention, the bicycle hydraulic operating device is configured such that the state of the hydraulic fluid is effectively confirmed even in such the hydraulic fluid flow path.

In accordance with a thirteenth aspect of the present invention, the bicycle hydraulic operating device according to the twelfth aspect is configured so that the base member includes a handlebar receiving recess arranged at a first end portion and a pommel portion arranged at a second end portion opposite to the first end portion. According to the thirteenth aspect of the present invention, the bicycle hydraulic operating device is configured such that the base member can be effectively located for easy use by a rider.

In accordance with a fourteenth aspect of the present invention, the bicycle hydraulic operating device according to the thirteenth aspect is configured so that the hydraulic reservoir tank at least partially forms the pommel portion. According to the fourteenth aspect of the present invention, the bicycle hydraulic operating device is configured such that the pommel portion of the base member is used effectively.

In accordance with a fifteenth aspect of the present invention, the bicycle hydraulic operating device according to any one of the first to fourteenth aspects further comprises a shifting unit disposed on one of the base member and the operating member. According to the fifteenth aspect of the present invention, the bicycle hydraulic operating device is configured to be used to perform a shifting function in addition to the braking function.

In accordance with a sixteenth aspect of the present invention, the bicycle hydraulic operating device according to any one of the first to fifteenth aspects further comprises a cover removably and reattachably disposed on the base member and at least overlying the fluid inspection portion. According to the sixteenth aspect of the present invention, the bicycle hydraulic operating device is configured to improve user comfort.

In accordance with a seventeenth aspect of the present invention, the bicycle hydraulic operating device according to the sixteenth aspect is configured so that the cover is configured to at least visually cover the fluid inspection portion, According to the seventeenth aspect of the present invention, the bicycle hydraulic operating device is configured to hide the fluid inspection portion.

In accordance with an eighteenth aspect of the present invention, the bicycle hydraulic operating device according to the sixteenth aspect is configured so that the cover is made of a rubber material. According to the eighteenth aspect of the present invention, the bicycle hydraulic operating device is configured to improve user comfort more effectively.

Also other objects, features, aspects and advantages of the disclosed bicycle hydraulic operating device will become apparent to those skilled in the art from the following detailed description, which, taken in conjunction with the annexed drawings, discloses one embodiment of the bicycle hydraulic operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
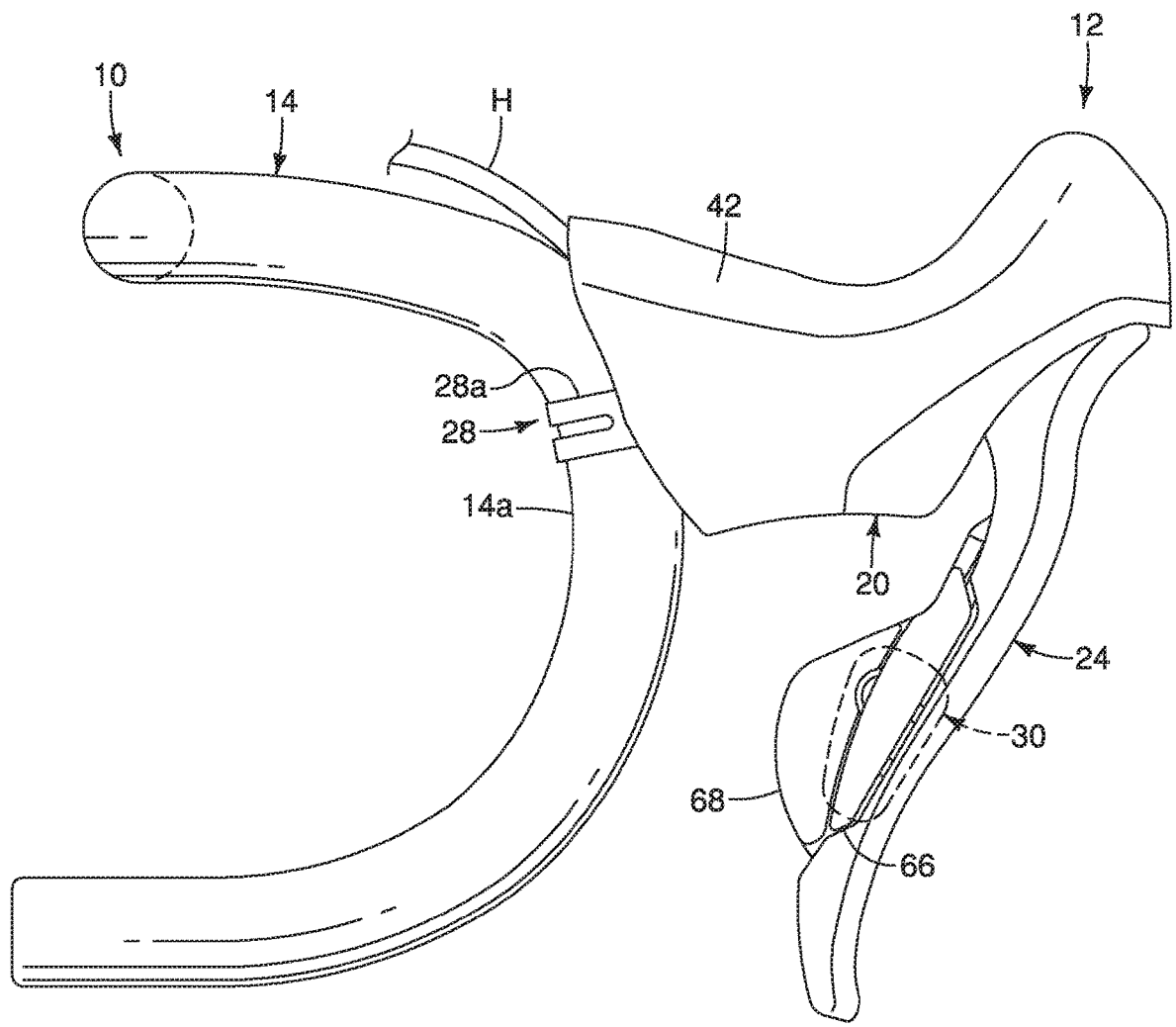
FIG. 1 is an outside elevational view of a portion of a bicycle equipped with a bicycle hydraulic operating device in accordance with a first illustrated embodiment in which the bicycle hydraulic operating device is coupled to a drop handlebar in an installed position.
Figure 2:
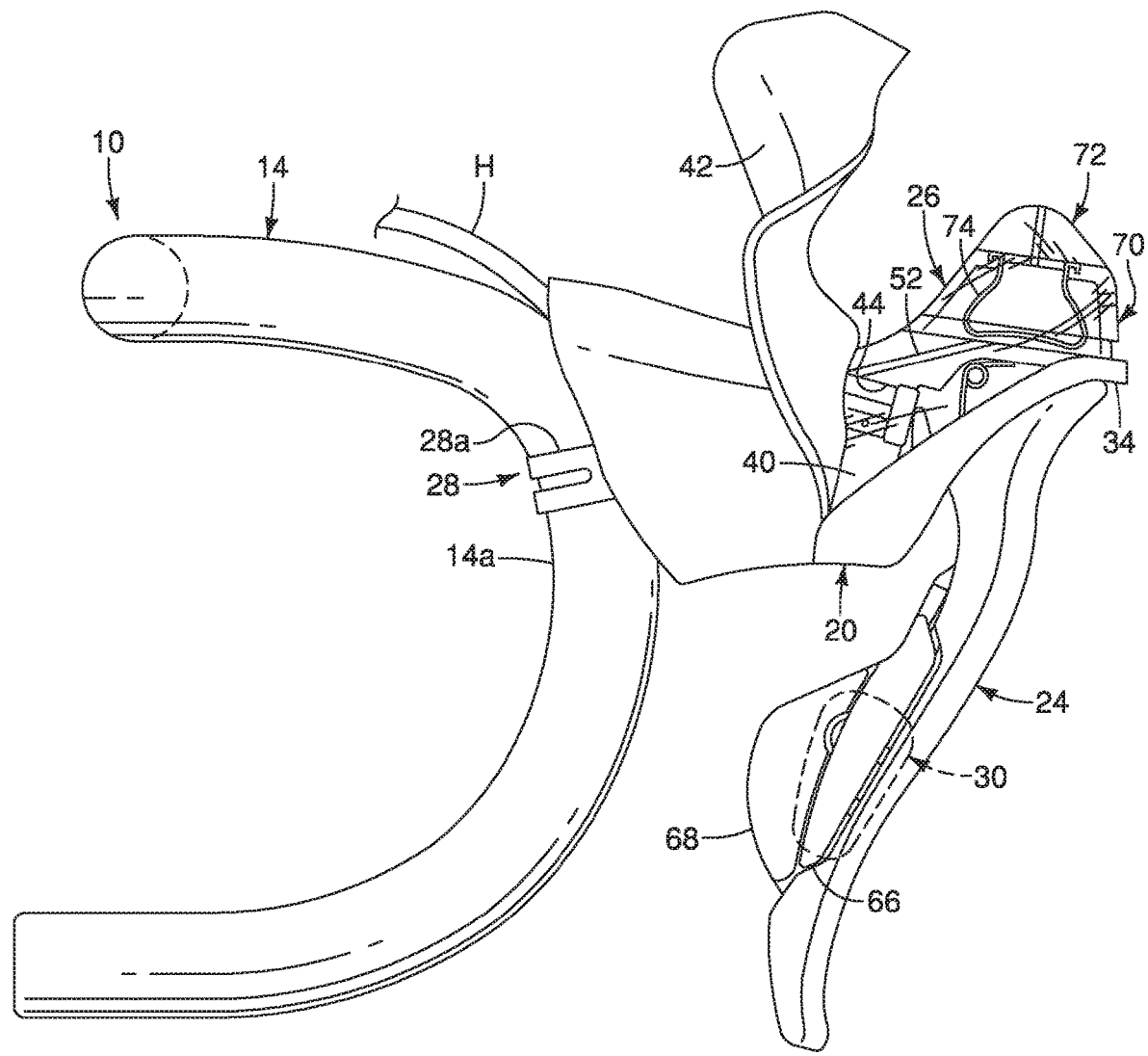
FIG. 2 is an outside elevational view, similar to FIG. 1, the bicycle hydraulic operating device coupled to the drop handlebar with the cover pulled back to expose fluid inspection portions of a base member and a hydraulic reservoir.

Referring initially to FIGS. 1 and 2, a bicycle 10 is illustrated that is equipped with a bicycle hydraulic operating device 12 in accordance with a first embodiment. The bicycle hydraulic operating device 12 is a right hand side control device operated by the rider's right hand to operate a first brake device (not shown) and a first gear shifting device (not shown, e.g., an electric rear derailleur). It will be apparent to those skilled in the bicycle field that the configuration of the bicycle hydraulic operating device 12 can be adapted to a left hand side control device that is operated by the rider's left hand.

As seen in FIGS. 1 and 2, the bicycle hydraulic operating device 12 is mounted to a drop handlebar 14. In particular, the bicycle hydraulic operating device 12 is mounted to a curved section 14a of the drop handlebar 14. In other words, the bicycle hydraulic operating device 12 is particularly designed for a bicycle that is equipped with the drop handlebar 14. As explained below, the bicycle hydraulic operating device 12 includes both a braking function and a shifting function in a single unit. However, it will be apparent to those skilled in the bicycle field from this disclosure that the shifting function could be eliminated from the bicycle hydraulic operating device 12 if needed and/or desired. The bicycle hydraulic operating device 12 is a bicycle hydraulic brake operating device that is specifically designed to be mounted to the curved section 14a of the drop handlebar 14.

In the first embodiment, the bicycle hydraulic operating device 12 is a bicycle brake/shift device, which is also known as a bicycle brifter. A bicycle brifter is a device that includes both a braking function and a shifting function in a single unit that is mounted to the bicycle. A bicycle dropdown brifter is a device that is specifically configured to be mounted to the curved section 14a of the drop handlebar 14, as illustrated in FIG. 1, and that includes both braking and shifting functions in a single unit.

As illustrated in FIG. 2, the bicycle hydraulic operating device 12 basically comprise a base member 20, a piston 22, an operating member 24 and a hydraulic reservoir 26. In the first embodiment, the piston 22 and the operating member 24 are configured as a piston pull-type hydraulic actuator. The bicycle hydraulic operating device 12 further comprises a handlebar mounting structure 28 that is disposed on the base member 20. Preferably, the bicycle hydraulic operating device 12 further comprises a shifting unit 30 that is disposed on one of the base member 20 and the operating member 24. In the first embodiment, the shifting unit 30 is disposed on the operating member 24.

As explained below, various parts of the bicycle hydraulic operating device 12 are made of a material that makes a hydraulic fluid flow path from the hydraulic reservoir 26 to a hydraulic cylinder chamber of the piston visually perceptible to a user without special tools. Thus, for example, various parts of the bicycle hydraulic operating device 12 are made of a transparent or translucent material such that the hydraulic fluid flow path is visually perceptible to a user without special tools therethrough transparent or translucent material. These various parts of the bicycle hydraulic operating device 12 in which the hydraulic fluid flow path is visually perceptible to a user without special tools constitute a fluid inspection portion of the bicycle hydraulic operating device 12.

Figure 3:
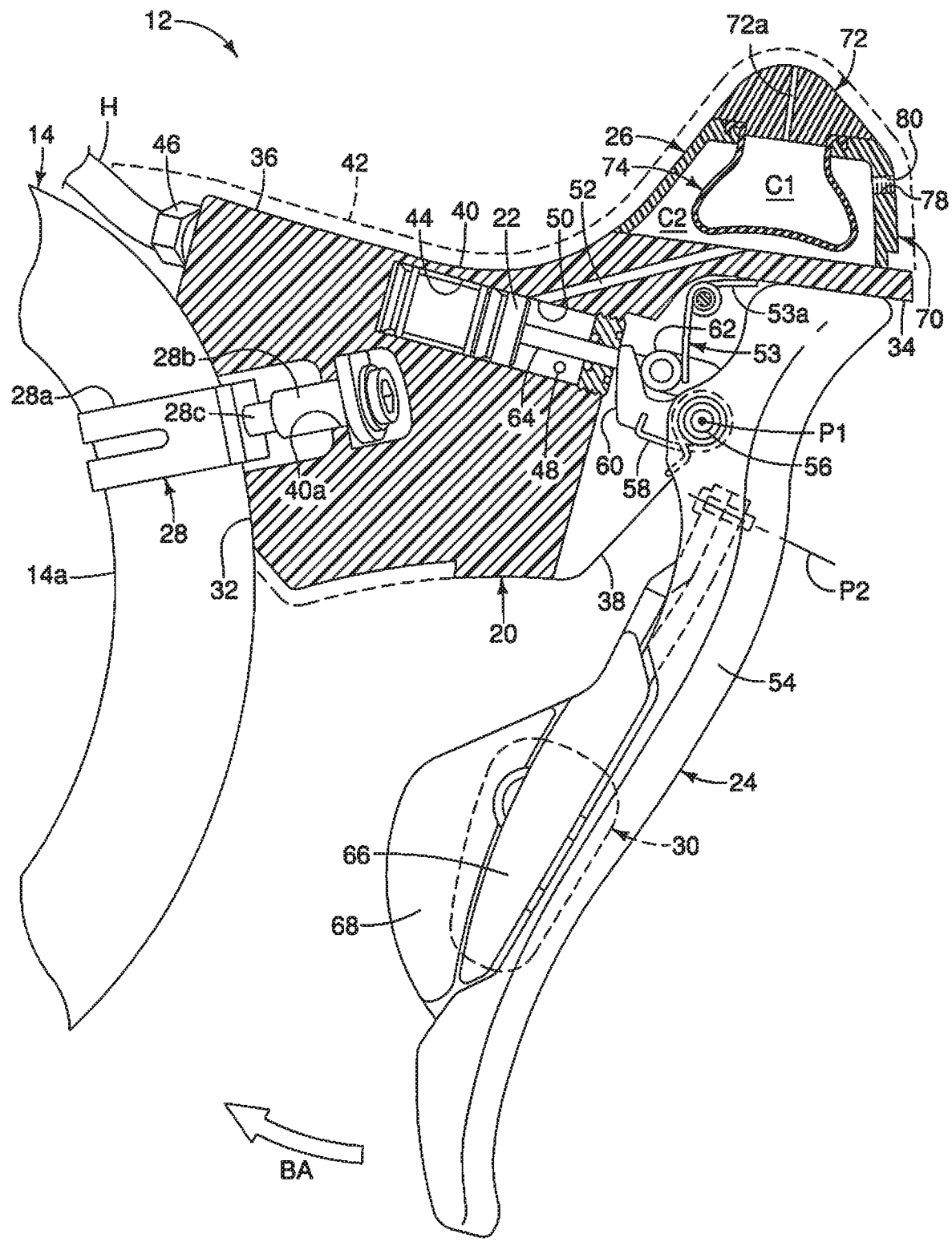
FIG. 3 is a longitudinal cross sectional view of the bicycle hydraulic operating device illustrated in FIGS. 1 and 2 with operating members in their rest positions (non-operated position)

As illustrated in FIG. 3, the base member 20 includes a handlebar receiving recess 32 and a pommel portion 34. The handlebar receiving recess 32 is arranged at a first end portion 36. The pommel portion 34 is arranged at a second end portion 38 that is opposite to the first end portion 36. The hydraulic reservoir 26 is provided on the base member 20 to form at least a part of the pommel portion 34. The hydraulic reservoir 26 is provided on the second end portion 38 of the base member 20 to form at least a part of the pommel portion 34. The base member 20 defines a drop handlebar bracket, which is made of a suitable rigid, hard material such as a hard plastic material (e.g., resin), a fiber reinforced plastic material (e.g., resin), a metallic material, etc. The base member 20 is configured to be gripped by a user. Thus, the base member 20 includes a grip portion 40 that is located at a middle portion of the drop handlebar bracket. In this first embodiment, the base member 20 essentially consists of a one-piece, unitary member. Of course, the base member 20 can include removable panels as needed and/or desired.

The handlebar mounting structure 28 is attached to the base member 20 at the handlebar receiving recess 32. The handlebar mounting structure 28 and the handlebar receiving recess 32 cooperate together to non-movably attach the base member 20 to the curved section 14a of the drop handlebar 14. In other words, the handlebar mounting structure 28 is a conventional handlebar clamp that is attached to the base member 20 for releasably securing the base member 20 to the curved section 14a of the drop handlebar 14. The handlebar mounting structure 28 basically includes a clamping band 28a (i.e., a handlebar clamping member) and a first fastener part 28b (nut) that screws unto a second fastener part 28c (bolt) of the clamping band 28a. The first and second fastener parts 28b and 28c are located in a hole 40a of the grip portion 40. In this way, in this first embodiment, the handlebar mounting structure 28 is disposed on the base member 20. With the handlebar mounting structure 28, a head of the first fastener part 28b applies a first force on the base member 20 and a head of the second fastener part 28c applies a second force on the clamping band 28a when the handlebar mounting structure 28 is tightened to secure the base member 20 to the curved section 14a of the drop handlebar 14. By tightening the first fastener part 28b, the clamping band 28a is moved toward the base member 20 such that the curved section 14a of the drop handlebar 14 is squeezed between the clamping band 28a and the base member 20. It will be apparent to those skilled in the bicycle field that the handlebar mounting structure 28 that is not limited to the illustrated clamp, but rather other suitable attachment mechanisms can be used as needed and/or desired. In any case, the handlebar mounting structure 28 is mounted on the base member 20 in the first embodiment.

As illustrated in FIGS. 1 and 2, the bicycle hydraulic operating device 12 further comprises a cover 42 that is stretched over at least the grip portion 40 and the pommel portion 34, which includes the hydraulic reservoir 26, to provide a cushion to the grip portion 40 of the base member 20 and to provide an attractive appearance. The cover 42 is configured to at least visually cover the fluid inspection portion. Accordingly, the shape of the cover 42 depends on which parts of the bicycle hydraulic operating device 12 forms the fluid inspection portion. The cover 42 is removably and reattachably disposed on the base member 20 and at least overlying the fluid inspection portion. In this way, the fluid inspection portion can be easily exposed for inspecting the hydraulic fluid flow path of the bicycle hydraulic operating device 12. Typically, the cover 42 is made of elastic material such as rubber. In the illustrated configuration, the cover 42 is also often referred to as a grip cover.

The base member 20 includes a cylinder bore 44. The piston 22 is movably disposed in the cylinder bore 44. The piston 22 and the internal surface of the cylinder bore 44 define a hydraulic cylinder chamber. As illustrated in FIG. 2, the cylinder bore 44 is directly formed by the base member 20. The cylinder bore 44 can be formed, for example, by cutting the base member 20 or die molding of the base member 20. The cylinder bore 44 is formed in a cylindrical shape. However, it will be apparent from this disclosure that an insert can be provided to the base member 20 to form the cylinder bore 44. A hydraulic hose connector 46 is screwed into the base member 20 to fluidly connect a hydraulic hose H to a hydraulic fluid channel (not shown) that connects the hydraulic hose connector 46 to an outlet port 48 of the hydraulic cylinder chamber. The cylinder bore 44 also has an inlet port 50 that is fluidly connected to the hydraulic reservoir 26 by a fluid passage 52. Thus, the hydraulic reservoir 26 is provided on the base member 20, and is fluidly connected to the cylinder bore 44 by the fluid passage 52.

The operating member 24 is coupled to the piston 22 to move the piston 22 within the cylinder bore 44. Thus, the piston 22 moves in the cylinder bore 44 in a reciprocal manner in response to operation of the operating member 24. In particular, the piston 22 moves linearly within the cylinder bore 44 (i.e., reciprocates linearly within the cylinder bore 44) to force the hydraulic fluid out of the outlet port 48 of the hydraulic cylinder chamber to a brake device via the hydraulic hose H. Thus, the piston 22, the operating member 24, the hydraulic reservoir 26 and the cylinder bore 44 constitute a hydraulic brake unit.

In this first embodiment, a biasing element 53 is provided for biasing the piston 22 to a rest position in which the hydraulic cylinder chamber has the largest volume. In the first illustrated embodiment, as seen in FIG. 4, the biasing element 53 is a pair of coil torsion springs 53a (return springs).

Figure 4:
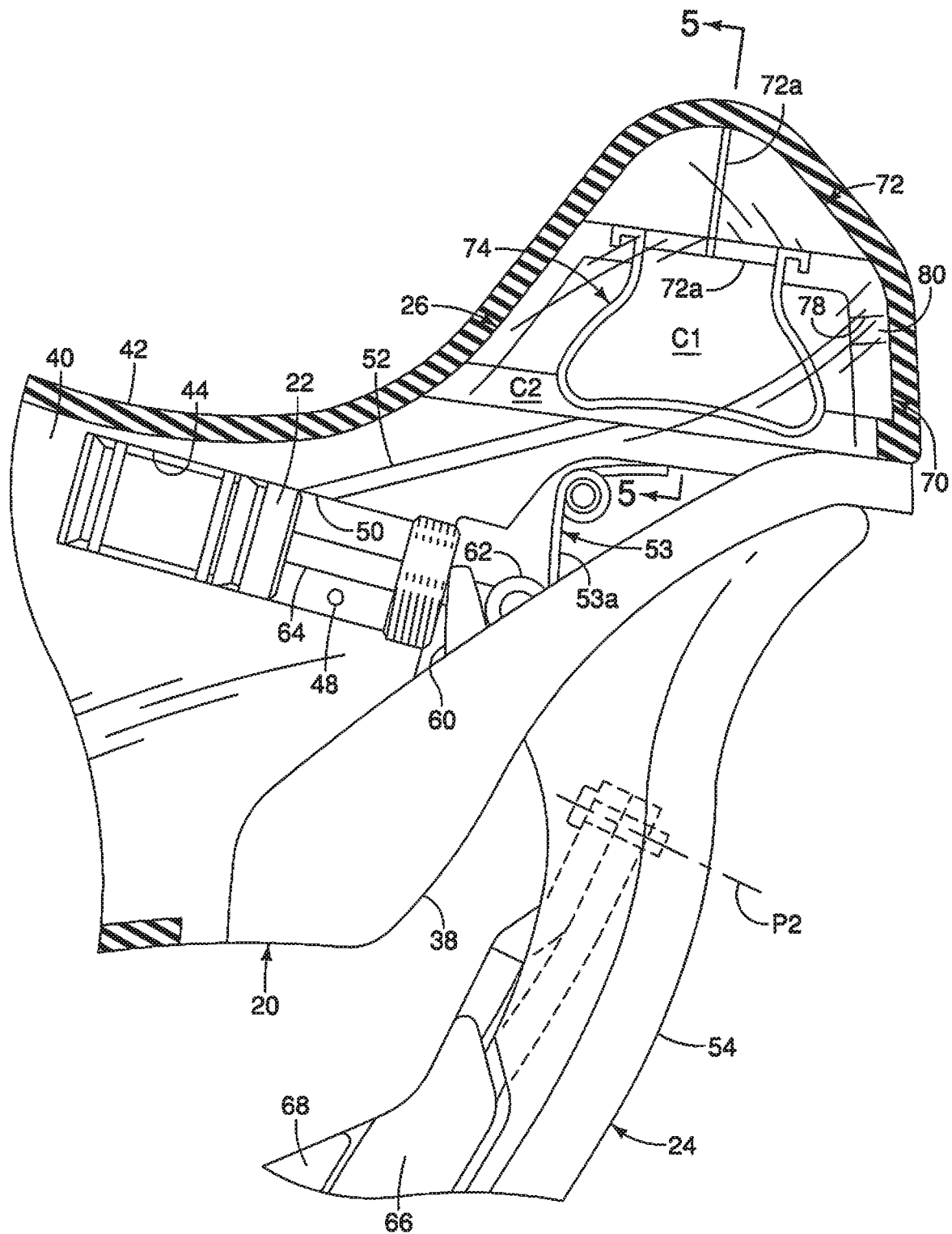
FIG. 4 is an enlarged, partial cross sectional view of a portion of the bicycle hydraulic operating device illustrated in FIGS. 1 and 2.

As illustrated in FIG. 4, the operating member 24 includes a lever 54 that is pivotally mounted relative to the base member 20. The lever 54 is directly pivotally mounted to the base member 20 by a pivot pin 56 that defines a pivot axis P1. The lever 54 is an elongated operating (brake) lever that is operatively coupled to the piston 22 for performing a bicycle braking operation. The lever 54 is biased to a rest position with respect to the base member 20 by a biasing element 58. The operating member 24 further includes an actuation cam 60 that operatively connects the piston 22 to the lever 54. The biasing element 58 is operatively coupled between the lever 54 and the actuation cam 60 to bias the lever 54 and the actuation cam 60 in opposite directions about the pivot axis P1. In this way, the lever 54 is biasing against the base member 20 to establish a rest position of the operating member 24, and the actuation cam 60 is biased into engagement with a pair of rollers 62 on a connecting rod 64 that is attached to the piston 22. The term "rest position" as used herein refers to a state in which the part (e.g., the operating member 24) remains stationary without the need of a user holding the part in that state corresponding to the rest position. Thus, the lever 54 moves relative to the base member 20 from the rest position along a brake operating path BA (FIG. 3) to a braking position for performing a braking operation of a brake device (not shown).

In the first embodiment, the lever 54 is provided with a pair of gearshift operating parts 66 and 68 for performing gearshifting operations of a gear changing device (not shown). The gearshift operating parts 66 and 68 are electrically connected to the shift unit 30 that is mounted within a recess in the base member 20. The gearshift operating parts 66 and 68 are pivotally mounted on the lever 54 to pivot about a pivot axis P2. The shift unit 30 and the gearshift operating parts 66 and 68 are constructed as shown in U.S. Patent Application Publication No. 2009/0031841 A1 (assigned to Shimano, Inc.). It will be apparent to those skilled in the bicycle field that the shift unit 30 and the gearshift operating parts 66 and 68 that are not limited to the illustrated structure and arrangement, but rather other suitable structures and arrangements can be used as needed and/or desired. Here, the shift unit 30 is an electrical shift unit that includes a microcomputer with a processor and a pair of electrical switches (e.g. press type contact switches or a normally open contactless switches). Alternatively, the processor of the shift unit 30 can be located in the base member 20 or remotely located from the bicycle hydraulic operating device 12 if needed and/or desired. Since various electrical shifting systems such as the one illustrated herein are known in the bicycle field, shift unit 30 and the gearshift operating parts 66 and 68 will not be discussed herein for the sake of brevity.

As seen in FIGS. 3 to 6, the hydraulic reservoir 26 is a separate part that is integrally fixed to the base member 20. The hydraulic reservoir 26 provides hydraulic fluid to the hydraulic cylinder chamber that is defined by the space formed between the piston 22 and the internal surface of the cylinder bore 44 in the base member 20. The hydraulic reservoir 26 is provided so that the necessary amount of hydraulic fluid can be injected from the hydraulic reservoir 26 even if the friction material (for example, a brake pad) of the braking device becomes worn. In particular, the amount of hydraulic fluid needed in the hydraulic cylinder chamber increase as the friction material of the braking device becomes worn. Also, the hydraulic reservoir 26 prevents inconsistencies in the pressure being applied to the braking device due to swelling and contraction caused by changes in the temperature of the hydraulic fluid. Hydraulic pressure is generated through the movement of the piston 22 in response to operation of the lever 54.

Basically, the hydraulic reservoir 26 includes a hydraulic reservoir tank 70, a reservoir lid 72 and a diaphragm 74. The diaphragm 74 is at least partially disposed inside the hydraulic reservoir tank 70. While the hydraulic reservoir tank 70 is illustrated as being separate from the base member 20, it will be apparent from this disclosure that the hydraulic reservoir tank 70 can be integrally molded as one-piece unitary member with respect to the base member 20. The diaphragm 74 divides the hydraulic reservoir tank 70 into an air chamber C1 and a hydraulic fluid chamber C2. The hydraulic reservoir 26 at least partially forms the pommel portion 34.

The hydraulic reservoir tank 70 is made of a suitable rigid, hard material such as a hard plastic material (e.g., resin), a fiber reinforced plastic material (e.g., resin), a metallic material, etc. However, preferably, the hydraulic reservoir tank 70 and the base member 20 are made of a resin material. In this way, the hydraulic reservoir tank 70 is bonded to the base member 20 by using a suitable adhesive and/or heat welding. In the first embodiment, preferably, the hydraulic reservoir tank 70 is fixed to the base member 20 by a fastenerless joint. The term "fastenerless joint" as used herein means a joint between two parts that is accomplished without using mechanical fasteners, such as but not limited to rivets or bolts, screws. The type of fastenerless joint will partly depend on the materials of the hydraulic reservoir tank 70 and the base member 20. Some examples of fastenerless joints include adhesive bonding, pressure-sensitive tapes, soldering, ultrasonic plastic welding, ultrasonic metal welding, plastic to plastic fusing, metal to metal arc welding, and laser welding. Thus, the fastenerless joint can be made without a binder material, such as an adhesive or a filler, or can be made with such a binder material.

In the first embodiment, a portion of the base member 20 is formed of a transparent or translucent material in the area of the hydraulic fluid flow path. In this way, a user can easily inspect both the cylinder bore 44 and the fluid passage 52. In the first embodiment, the portion of the base member 20 that is covered by the cover 42 is made of a transparent or translucent material, while the portion of the base member 20 that is not covered by the cover 42 is not made of a transparent or translucent material. Thus, with the cover 42 fully installed on the base member 20 and the hydraulic reservoir 26, the portion of the base member 20 that is not covered by the cover 42 is made of an opaque material. Also in the first embodiment, the hydraulic reservoir 26 entirely is formed of a transparent or translucent material. In other words, the hydraulic reservoir tank 70, the reservoir lid 72 and the diaphragm 74 are all entirely made of a transparent or translucent material. In this way, a user can easily inspect the inside of the hydraulic reservoir 26. However, it is not necessary for the hydraulic reservoir tank 70, the reservoir lid 72 and the diaphragm 74 to be entirely made of a transparent or translucent material. At least part of one of the base member 20 and the hydraulic reservoir 26 includes a fluid inspection portion making visually perceptible therethrough at least a portion of a hydraulic fluid flow path that includes the hydraulic reservoir 26, the cylinder bore 44 and the fluid passage 52. Preferably, the fluid inspection portion is disposed on at least one of the hydraulic reservoir tank 70, the reservoir lid 72 and the diaphragm 74.

Figure 5:
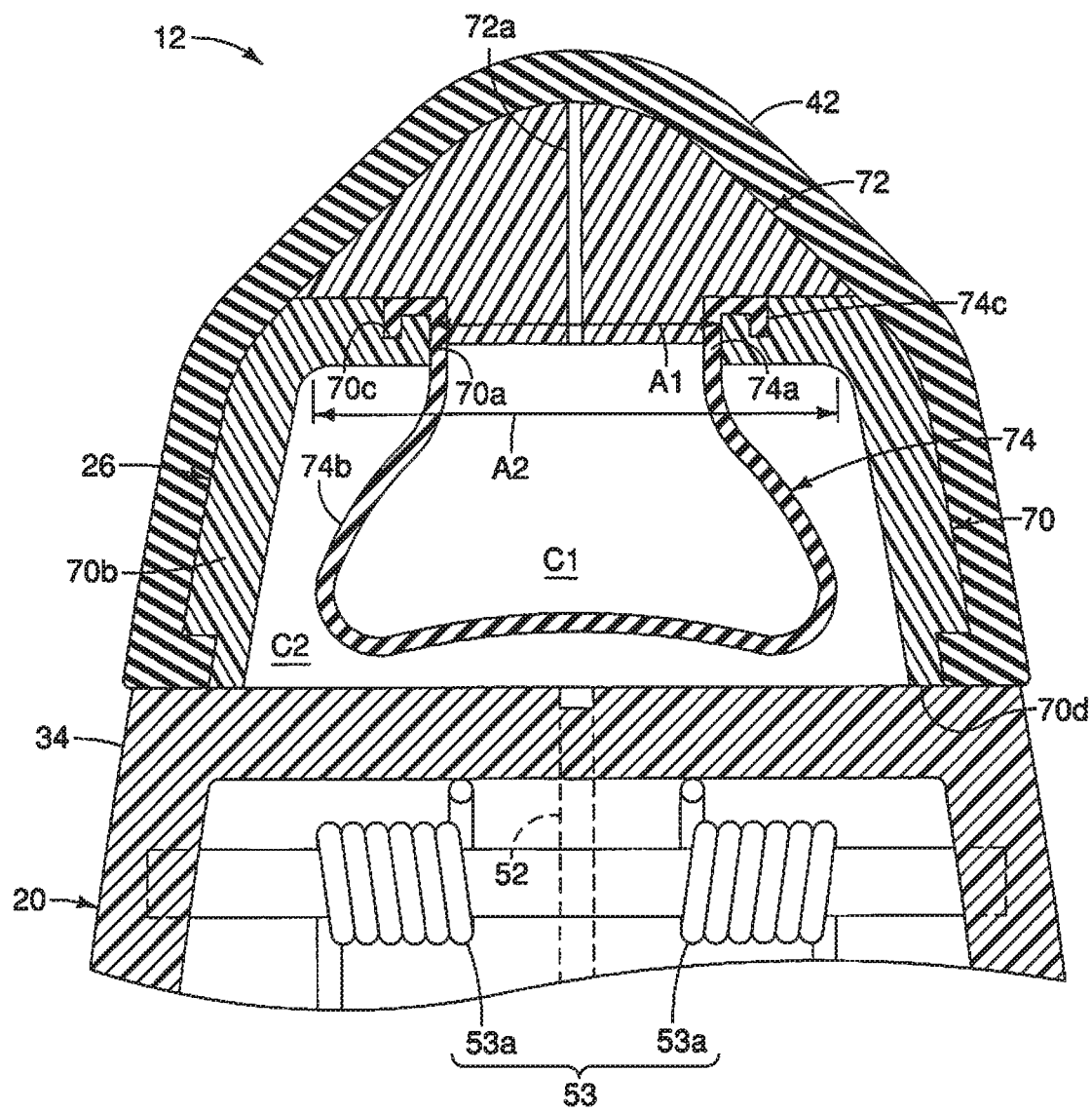
FIG. 5 is an enlarged, partial transverse cross sectional view of a portion of the bicycle hydraulic operating device illustrated in FIGS. 1 to 3 as seen along section line 5-5 of FIG. 4.

Referring to FIGS. 4 and 5, the hydraulic reservoir tank 70 is fluidly connected to the cylinder bore 44. In particular, the fluid passage 52 fluidly connects hydraulic reservoir tank 70 to the cylinder bore 44. The hydraulic reservoir tank 70 has a tank opening 70a and a tank body 70b. The reservoir lid 72 closes the tank opening 70a of the hydraulic reservoir tank 70. The bicycle hydraulic operating device 12 preferably further comprises a bleed port 78 fluidly connected to the hydraulic fluid flow path. The bleed port 78 is preferably disposed on the hydraulic reservoir 26 as in the first embodiment. In particular, as seen in FIG. 3, the hydraulic reservoir tank 70 includes the bleed port 78 for bleeding air from the hydraulic fluid chamber C2. The bleed port 78 can also be used for adding hydraulic fluid to the hydraulic fluid chamber C2 instead of removing the reservoir lid 72. The bleed port 78 is closed by a bleed screw 80. Thus, the bleed port 78 has an internal thread for screwing the bleed screw 80 into the bleed port 78.

Figure 6:
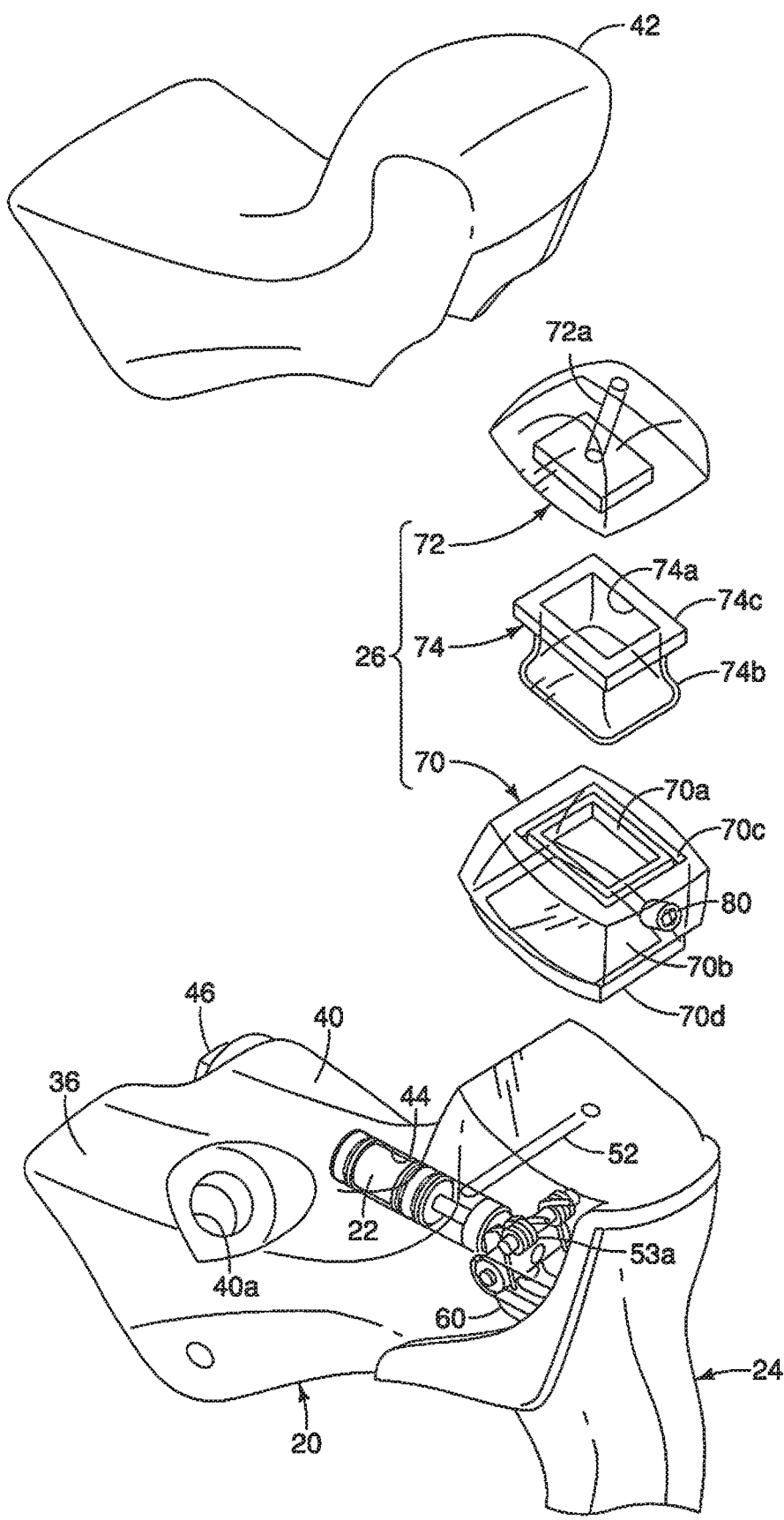
FIG. 6 is a perspective view of selected parts of the bicycle hydraulic operating device illustrated in FIGS. 1 to 4.

In the first embodiment, as seen in FIG. 6, the tank opening 70a is rectangularly shaped. Specifically, the tank opening 70a is stepped for receiving a portion of the diaphragm 74 as discussed below. The upper edge of the hydraulic reservoir tank 70 has an annular groove 70c that receives a portion of the diaphragm 74. The hydraulic reservoir tank 70 has a non-uniformed shape in which the tank opening 70a has a different cross sectional profile from a cross sectional profile of the tank body 70b. In this way, the tank body 70b of the hydraulic reservoir tank 70 can be made larger than the tank opening 70a. In the first embodiment, preferably, the hydraulic reservoir tank 70 has an open bottom defined by a peripheral edge 70d that is fixed to the base member 20 by the fastenerless joint.

Here, in the first embodiment, the hydraulic reservoir tank 70 is free of a bottom wall and is free of hidden surfaces. In other words, the hydraulic reservoir tank 70 has only non-hidden surfaces. In this way, the tank body 70b can be integrally molded as one-piece, unitary member using straight, draw-type molds that have no undercut (hidden) surfaces, (i.e., with only non-hidden surfaces). The phrase "hidden surface(s)" as used in this disclosure refers to a surface or surfaces of a molded part which does not directly face a straight draw-type mold. In other words, a hidden surface or an undercut surface is a surface which faces another surface of the molded part such that a pair of straight draw-type molds cannot be used to form the hidden surface. The phrase "draw-type injection molding" as used herein refers to the use of an injection mold comprised of two halves which are separated from each other by moving each half of the mold apart from the other along a straight line to create an injection molded part without the use of mold sliders to create hidden or undercut surfaces.

Referring to FIG. 5, the tank opening 70a defines an opening cross sectional area A1. The opening cross sectional area A1 of the tank opening 70a is defined as a minimum area in the case where the tank opening 70a has a non-uniform shape as is the case of the first embodiment. The hydraulic reservoir tank 70 defines a tank cross sectional area A2 that is parallel to the opening cross sectional area A1. The tank cross sectional area A2 of the tank body 70b is defined as a minimum area in the case where the tank body 70b has a non-uniform shape as is the case of the first embodiment. The opening cross sectional area A1 of the tank opening 70a is smaller than the tank cross sectional area A2 of the hydraulic reservoir tank 70.

The diaphragm 74 is a flexible, resilient member made of a suitable material such as a rubber material. The diaphragm 74 is a unitary, one-piece member. Preferably, as in the first embodiment, the diaphragm 74 is a bottle shaped member including a neck portion 74a and a body portion 74b which is larger than the neck portion 74a. Preferably, the hydraulic reservoir tank 70 has the bleed port 78 opening adjacent to a neck area of the hydraulic fluid chamber C2 that is defined by the neck portion 74a of the diaphragm 74.

As seen in FIG. 4, the body portion 74b of the diaphragm 74 has a cross sectional area A3 that is parallel to the opening cross sectional area. A1. The cross sectional area A3 of the body portion 74b of the diaphragm 74 is defined as a maximum area in the case where the body portion 74b of the diaphragm 74 has a non-uniform shape as is the case of the first embodiment. Also, the cross sectional area A3 of the body portion 74b of the diaphragm 74 is larger than the opening cross sectional area. A1 of the tank opening 70a. The neck portion 74a has a diaphragm opening 74c which is arranged opposite to the body portion 74b. The neck portion 74a is fixed on the tank opening 70a. In particular, the neck portion 74a has a peripheral mounting flange 74c that extends annularly outwards. The annular groove 70c in the upper edge of the hydraulic reservoir tank 70 receives the peripheral mounting flange 74c of the diaphragm 74. The peripheral mounting flange 74c of the diaphragm 74 is sandwiched between the reservoir lid 72 and the upper edge of the hydraulic reservoir tank 70.

The reservoir lid 72 is frictionally retained in the tank opening 70a of the hydraulic reservoir tank 70 by slightly compressing the diaphragm 74. As a result, a seal is created by the diaphragm 74 between the hydraulic reservoir tank 70 and the reservoir lid 72. The reservoir lid 72 has an air passageway 72a connecting the air chamber C1 to outside of the base member 20. Preferably, the reservoir lid 72 is made of a resin material.

Figure 7:
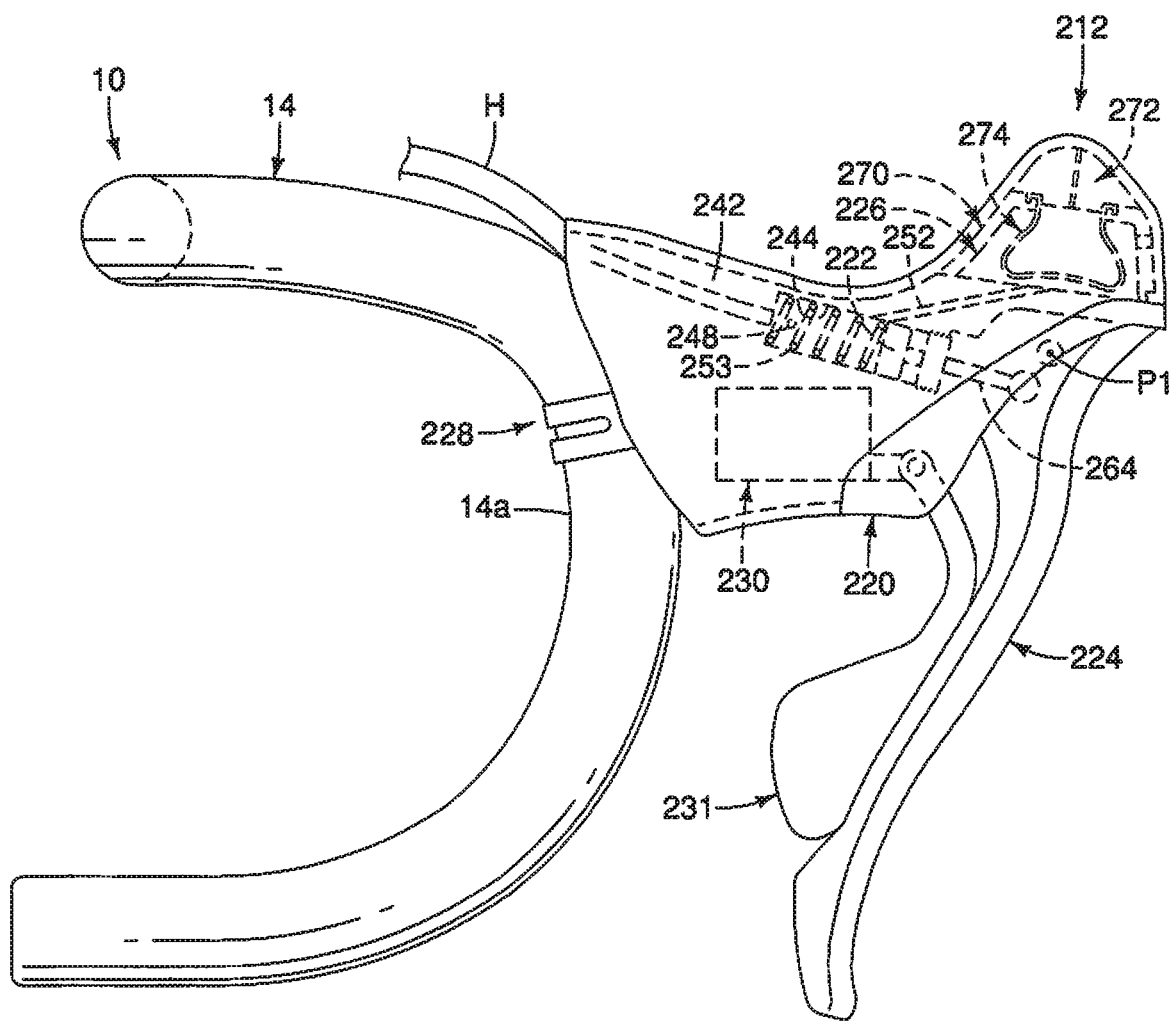
FIG. 7 is an outside elevational view of a portion of a bicycle equipped with a bicycle hydraulic operating device in accordance with a second embodiment in which the bicycle hydraulic operating device is coupled to a drop handlebar in an installed position.

Referring now to FIG. 7, a bicycle hydraulic operating device 212 is illustrated in accordance with a second embodiment. The bicycle hydraulic operating device 212 basically comprises a base member 220, a piston 222, an operating member 224 and a hydraulic reservoir 226. The bicycle hydraulic operating device 212 further comprises a handlebar mounting structure 228 that is disposed on the base member 220. Preferably, the bicycle hydraulic operating device 212 further comprises a shifting unit 230 that is disposed on the base member 220. Also the bicycle hydraulic operating device 212 further comprises a cover 242. The hydraulic reservoir 226 is fluidly connected to a cylinder bore 244 that is formed in the base member 220. The hydraulic reservoir 226 is identical to the hydraulic reservoir 26. The cylinder bore 244 has an outlet port 248 that is fluidly connected to the hose H. Also, a fluid passage 252 extends between the hydraulic reservoir 226 and the cylinder bore 244 for supplying hydraulic fluid from the hydraulic reservoir 226 to the cylinder bore 244. Thus, the hydraulic reservoir 226 includes a hydraulic reservoir tank 270, a reservoir lid 272 and a diaphragm 274.

The shifting unit 230 is a mechanical shifting unit that basically has the same structure and operates in the same way as the so called holding mechanism that is disclosed in U.S. Pat. No. 7,779,718. However, the shifting unit 230 has been configured to be supported by the base member 220 and operated by a control cable (e.g., Bowman cable). In other words, the shifting unit 230 is operated by a control lever 231 in the same manner as the control lever for the so called holding mechanism that is disclosed in U.S. Pat. No. 7,779,718. Since the structure and operations of the shifting unit 230 are well known to those skilled in the bicycle field, the structure and operations of the shifting unit 230 will not be discussed in detail herein.

In the third embodiment, the piston 222 and the operating member 224 are configured as a piston push-type hydraulic actuator. Here, a biasing element 253 is provided for biasing the piston 222 to a rest position in which the hydraulic cylinder chamber has the largest volume. In the third embodiment, the biasing element 253 is a compression spring. The biasing element 253 is also used to biasing the operating member 224 to a rest position. In particular, the piston 222 is operatively coupled to the operating member 224 by a connecting rod 264. Thus, the biasing force of the biasing element 253 is transmitted to the operating member 224 via the connecting rod 264. Preferably, the connecting rod 264 has a first end pivotally coupled to the piston 222 and a second end pivotally coupled to the operating member 224.

Here, the operating member 224 is pivotally mounted on the base member 220 to pivot about the pivot axis P1 such that operation of the operating member 224 from the rest position to an operated position about the pivot axis P1 causes the piston 222 to be pushed inside of the cylinder bore 244. Thus, hydraulic fluid is forced out of the cylinder bore 244 via the outlet port 248 to the brake device (not shown). Since the piston push-type hydraulic actuators are known in the bicycle field, the piston push-type hydraulic actuator of the bicycle hydraulic operating device 212 will not be discussed or illustrated in detail herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle hydraulic operating device. Accordingly, these directional terms, as utilized to describe the bicycle hydraulic operating device should be interpreted relative to a bicycle in an upright riding position on a horizontal surface and that is equipped with the bicycle hydraulic operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning; for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic operating device comprising:
   a base member having a cylinder bore;
   a piston movably disposed in the cylinder bore;
   an operating member coupled to the piston to move the piston within the cylinder bore;
   a hydraulic reservoir provided on the base member and fluidly connected to the cylinder bore by a fluid passage;
   a bleed port in fluid communication with the hydraulic reservoir;
   a bleed screw removably disposed in the bleed port; and
   a cover covering the base member and the bleed screw,
   at least part of one of the base member and the hydraulic reservoir includes a fluid inspection portion making visually perceptible therethrough at least a portion of a hydraulic fluid flow path that includes the hydraulic reservoir, the cylinder bore and the fluid passage in a state where the cover is partially removed without being completely separated from the base member, the cover overlaying the fluid inspection portion in an unremoved state to visually cover the fluid inspection portion.

2. The bicycle hydraulic operating device according to claim 1, wherein
   the hydraulic reservoir includes a hydraulic reservoir tank provided on the base member, a reservoir lid closing a tank opening of the hydraulic reservoir tank and a diaphragm that is at least partially disposed inside the hydraulic reservoir tank.

3. The bicycle hydraulic operating device according to claim 2, wherein
the hydraulic reservoir tank and the base member are made of a resin material.

4. The bicycle hydraulic operating device according to claim 3, wherein
the reservoir lid is made of a resin material.

5. The bicycle hydraulic operating device according to claim 2, wherein
the fluid inspection portion is disposed on at least one of the hydraulic reservoir tank, the reservoir lid and the diaphragm.

6. The bicycle hydraulic operating device; to claim 2, wherein
the hydraulic reservoir tank is bonded to the base member.

7. The bicycle hydraulic operating device according to claim 2, wherein
the hydraulic reservoir tank is fixed to the base member by a fastenerless joint.

8. The bicycle hydraulic operating device according to claim 1, further comprising
a handlebar mounting structure disposed on the base member.

9. The bicycle hydraulic operating device according to claim 1, wherein
the operating member includes a lever pivotally mounted relative to the base member.

10. The bicycle hydraulic operating device according to claim 1, wherein
the base member is configured to be gripped by a user.

11. The bicycle hydraulic operating device according to claim 10, wherein
the base member includes a handlebar receiving recess arranged at a first end portion and a pommel portion arranged at a second end portion opposite to the first end portion.

12. The bicycle hydraulic operating device according to claim 11, wherein
the hydraulic reservoir at least partially forms the pommel portion.

13. The bicycle hydraulic operating device according to claim 1, further comprising
a shifting unit disposed on one of the base member and the operating member.

14. The bicycle hydraulic operating device according to claim 1, wherein
the cover is removably and reattachably disposed on the base member and at least overlying the fluid inspection portion.

15. The bicycle hydraulic operating device according to claim 14, wherein
the cover is configured to at least visually cover the fluid inspection portion.

16. The bicycle hydraulic operating device according to claim 14, wherein
the cover is made of a rubber material.

* * * * *

UNITED STATES PATENT AND TRADEMARK OFFICE
CERTIFICATE OF CORRECTION

PATENT NO. : 10,668,907 B2  
APPLICATION NO. : 15/184948  
DATED : June 2, 2020  
INVENTOR(S) : Miki et al.

Page 1 of 1

It is certified that error appears in the above-identified patent and that said Letters Patent is hereby corrected as shown below:

On the Title Page

In Column 1, Line 12, Item (22), delete "(22) Filed: Jun. 16, 2018" and insert -- (22) Filed: Jun. 16, 2016 --.

Signed and Sealed this  
Eleventh Day of August, 2020

Andrei Iancu  
*Director of the United States Patent and Trademark Office*